March 25, 1958 H. J. BUTLER 2,827,985
MECHANICAL SERVO BRAKE
Filed March 7, 1955 4 Sheets-Sheet 1
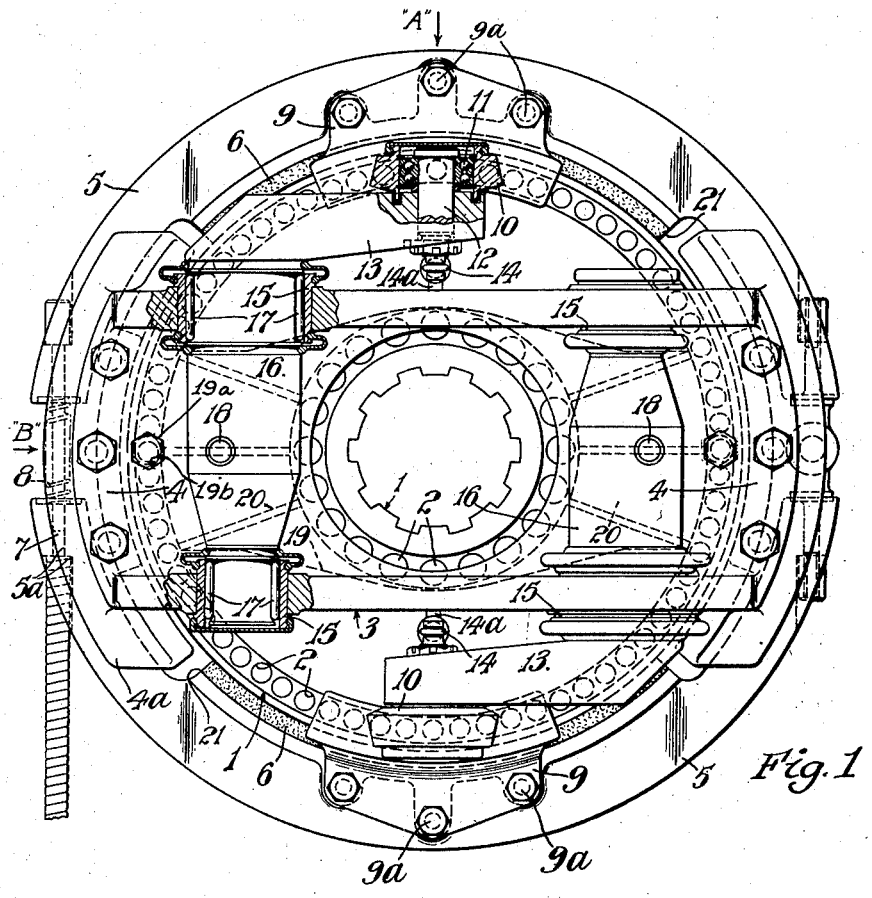
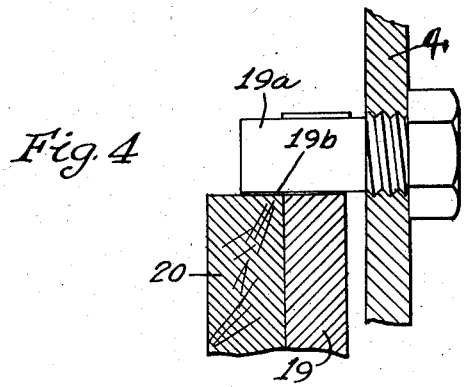
Fig. 4
INVENTOR
Henry James Butler
by Benj. T. Grauber
his attorney March 25, 1958 H. J. BUTLER 2,827,985
MECHANICAL SERVO BRAKE
Filed March 7, 1955 4 Sheets-Sheet 3

INVENTOR
Henry James Butler
by Benj. T. Rauber
his attorney

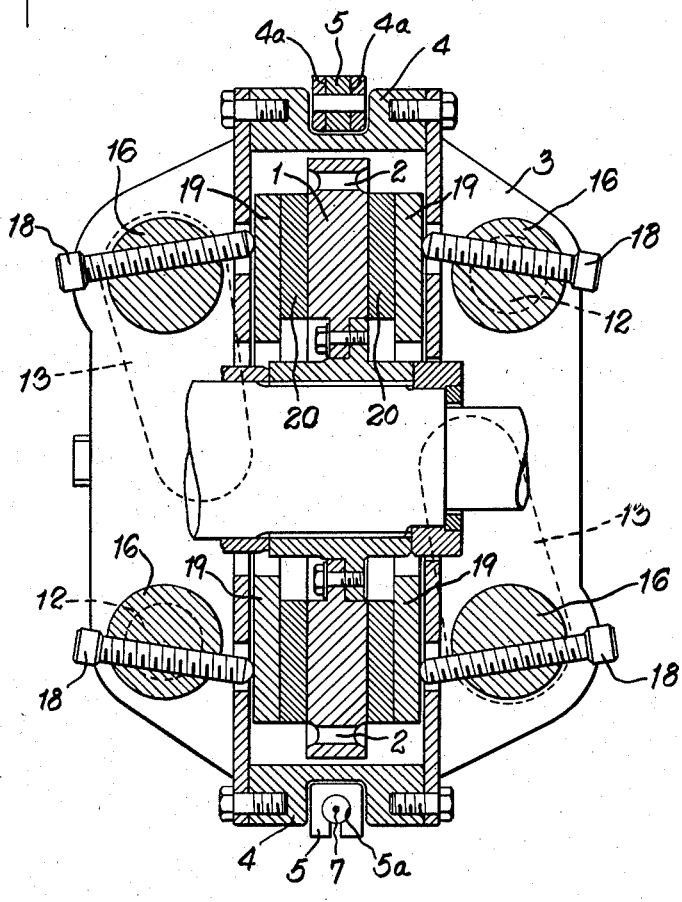

United States Patent Office 2,827,985
Patented Mar. 25, 1958

2,827,985

MECHANICAL SERVO BRAKE

Henry James Butler, Sutton Coldfield, England, assignor to Dunlop Rubber Company Limited, London County, England, a British company Application March 7, 1955, Serial No. 492,656

Claims priority, application Great Britain March 16, 1954

9 Claims. (Cl. 188—70)

This invention relates to mechanical servo brakes, and more particularly to mechanical servo disc brakes for heavy vehicles, tanks and the like.

Fluid pressure operated servo disc brakes for vehicles are known. In some vehicles, however, particularly military tanks and the like, it is preferred to avoid hydraulic liquid and depend entirely on an all-mechanical servo brake. The object of the present invention is to provide an all-mechanical brake of this type.

According to the present invention a mechanical servo brake comprises a rotatable disc, a brake shoe to frictionally engage the outer periphery of said disc and angularly movable thereby, pads of friction material to frictionally engage the radially extending sides of said disc, and means actuated by angular movement of the said brake shoe for effecting frictional engagement between said brake pads and the radially-extending sides of the disc.

Preferably two part-circular brake shoes are provided to partially encircle the disc and frictional engagement between the shoe linings and the outer periphery of the disc is effected through a cable and lever. Each brake shoe is provided centrally with a pair of cam members, one on each side thereof. Associated with the cam-member is a roller situated at one end of an arm having a shaft integral with the other end thereof, said shaft being rotatable in bearings in torque members axially-aligned and non-rotatably secured on each side of the disc. A screwed member fitted eccentrically in said shaft is adapted to force pressure plates towards the disc from each side thereof whereby friction pads secured to said pressure plates move into frictional contact with the disc.

The brake is applied by first applying the primary brake, i. e. the shoes encircling the disc. The ensuing torque angularly moves said shoes and the cam-members secured thereto. The rollers ride up the slopes of the cam-members to angularly move the arms and thereby apply the main brake. The main braking load is thus determined by the initial effort on the cable. A high mechanical advantage may be built up.

The invention will now be described with reference to the accompanying drawings of which:

Figure 1 is a part-sectional view of a mechanical servo brake constructed according to the present invention.

Figure 4 is a detail section of a brake pad retaining means.

Figure 5 is a section on the line 5—5 of Figure 3.

Figure 2:
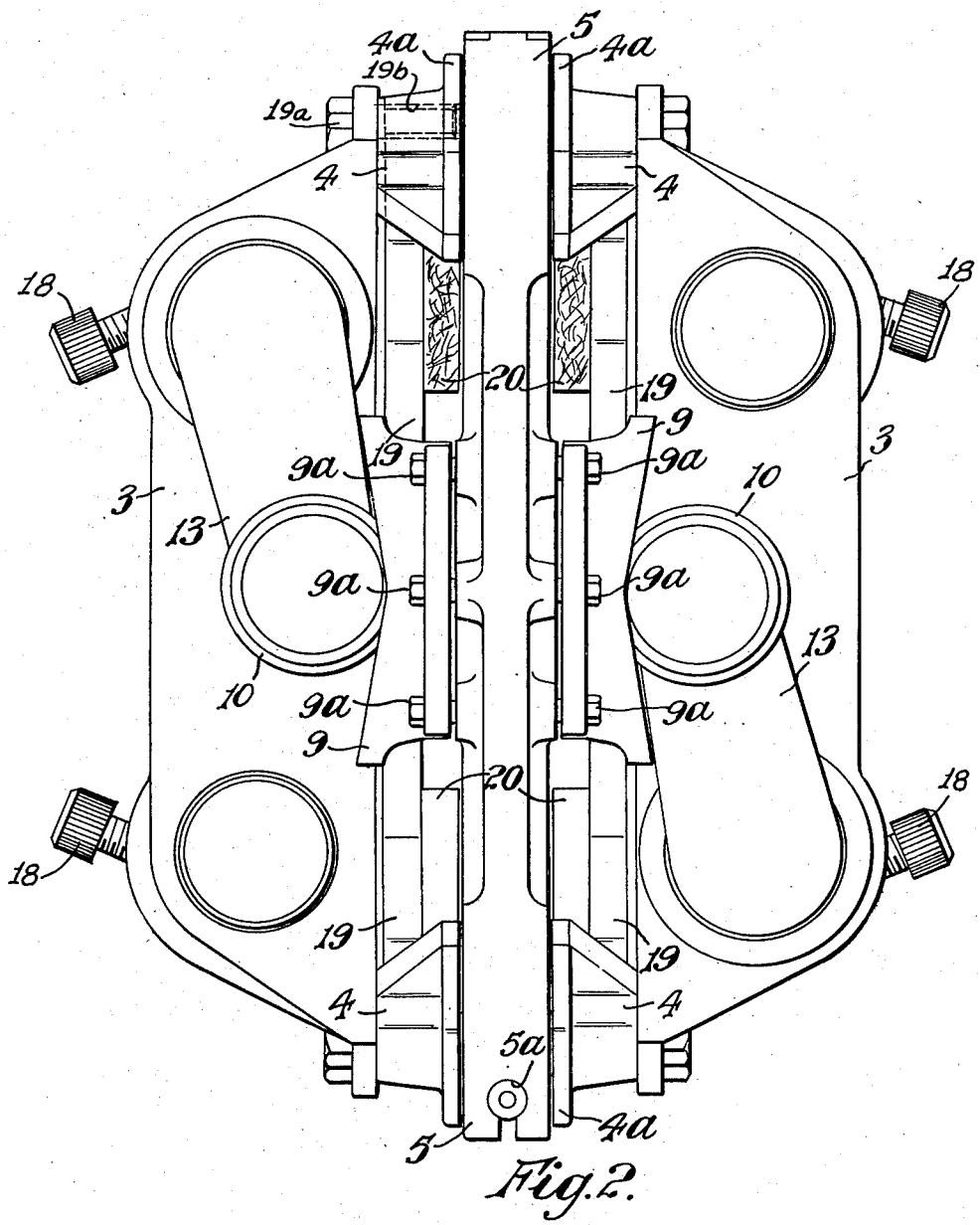
Figure 2 is a view of the brake of Figure 1 looking in the direction of arrow "A."

In this embodiment of the present invention (Figure 1) a disc brake for a heavy tank retardation brake comprises an annular disc 1 dogged at its inner periphery to engage with splines on a driving shaft (not shown), whereby the disc 1 is driven by the shaft. The disc 1 is provided, adjacent its inner and its outer peripheries, with a plurality of axially-aligned holes 2 which promote air turbulence, assist cooling and restrict transmission of heat to the shaft and associated bearings.

Two substantially rectangular members 3 of channel section are provided, axially-aligned one on each side of the disc and extending diametrically across the disc, the trough of the channel section being presented away from the disc. Arcuate bridge-pieces 4, extending axially adjacent the outer periphery of the disc 1, are bolted to the end of said members 3 to form a rigid box-like structure. Each member 3 is provided centrally with a hole to allow the driving shaft to pass through it, and said members 3 are non-rotatably secured to a rigid part of the tank structure.

Two substantially semi-annular brake shoes 5 are pivotally secured together at two adjacent ends and are fitted around the periphery of the disc 1 to almost completely encircle it. Each shoe 5 is provided with a strip of friction material 6 to frictionally engage the outer periphery of the disc 1. A cable 7 has one end secured to the free end of one of said shoes 5 and passes through a hole 5a extending tangentially through the adjacent free end of the other shoe 5 and a helically-wound compression spring 8 is fitted between said free ends. The shoes 5 are prevented from axial displacement by guides 4a (Figure 2) formed on the bridge pieces 4. Thus on tensioning the cable 7 as by a brake lever or the like the shoes 5 are tightened around the periphery of the disc 1 to effect frictional engagement and the shoes 5 are urged in the direction of rotation of the disc 1.

Secured to the centre of each brake shoe 5 and on each side thereof is a cam-member 9 comprising a shallow V-shaped member, extending axially outwardly from the brake shoes 5 and aligned with the curved outer periphery of the disc. A roller 10 co-operates with each cam-member 9, there being thus four rollers 10 in all. Each roller 10 is rotatable on bearings 11 about a spindle 12, the spindles 12 on the same side of the disc being axially aligned across a diameter of the disc.

The outer peripheral rolling surface of each roller 10 is not parallel with the axis thereof but is tapered towards the outer periphery of the disc. The operative edge of each associated cam-member 9 is tapered in a complementary manner. The effect of this is to maintain the brake shoes 5 substantially co-axial relative to the disc 1 when the brake is off and it also helps to move the shoes 5 out of braking engagement with the periphery of the disc 1 when the tension in the cable 7 is removed.

Figure 3:
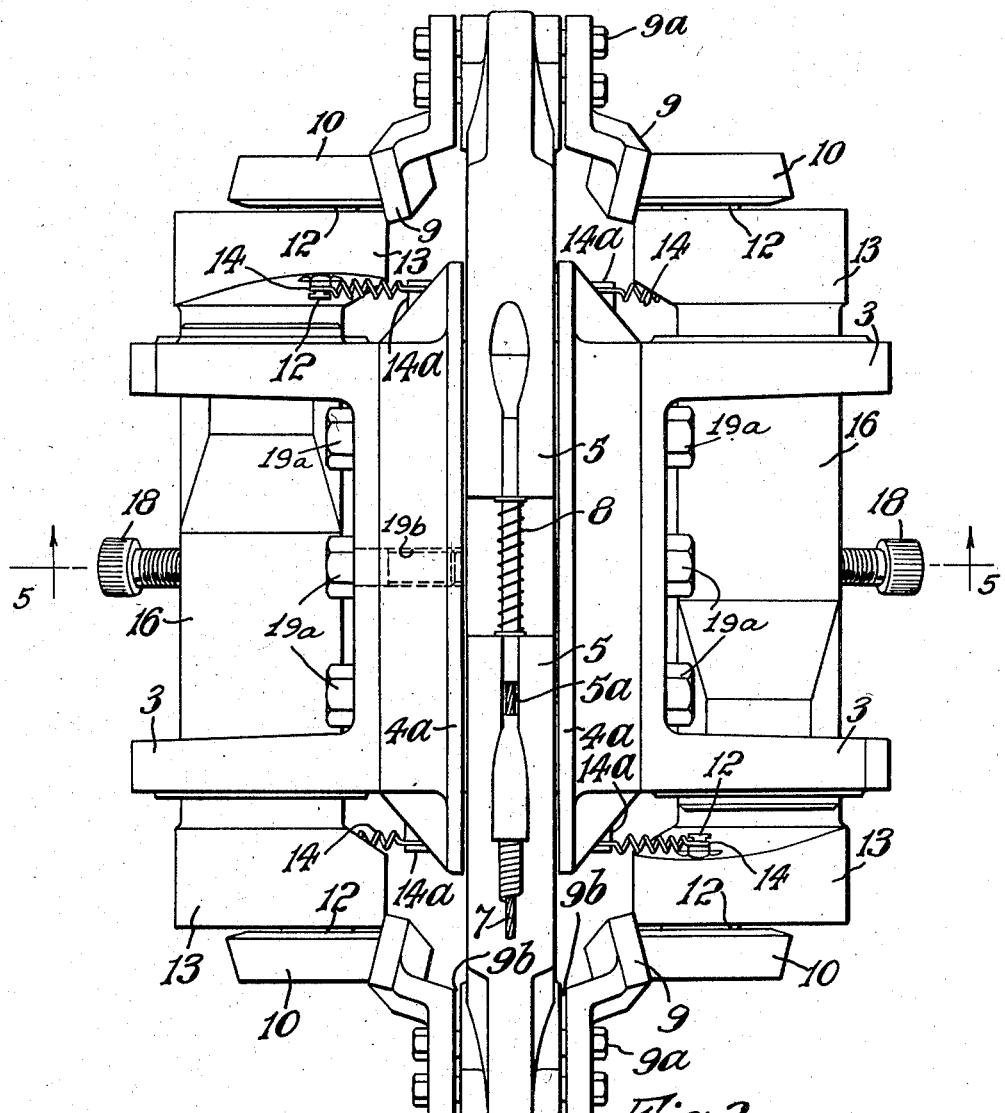
Figure 3 is a view of the brake of Figure 1 looking in the direction of arrow "B."

The cam-members 9 are secured, one on each side of a brake shoe, by studs 9a, and a small clearance 9b (Figure 3) is provided between each cam-member 9 and the adjacent side of the brake shoe 5. The purpose of this is to allow the cam-members a certain amount of lateral movement and thus relieve the brake shoes 5 of side thrust and to compensate for any uneven wear of the main friction pads.

Each spindle 12 is set in the end of an arm 13 and each arm extends substantially parallel to the major axis of the channel member 3, one arm 13 on one side of the disc 1 extending towards one end of said member 3 and the other arm 13 extending towards the other end of said member 3.

The end of each spindle 12 remote from the roller 10 is secured, by means of a helically wound spring 14, to a stud 14a secured to an adjacent part of the channel member 3. This spring 14 ensures that the main brakes come off when the tension in the brake cable 7 is removed, as will be hereinafter described.

Each of said channel members 3 is provided adjacent its ends, with a pair of cylindrical bosses 15 each of which extends through a side wall of said channel member 3, the bosses 15 at each end being axially-aligned and having their axes normal to the major axis of the channel member 3. A shaft 16, integral with the end of each arm 13 remote from the cam 9 and roller 10, is rotatably fitted on needle bearings 17 through each axially-aligned pair of bosses 15, an intermediate portion on said shaft 16, i. e. between each pair of bosses 15, being provided with an eccentrically-mounted screwed member 18 which extends inwardly towards the disc 1. Angular movement of each arm 13 in one direction, therefore, rotates the shaft 16 to move the screwed member 18 inwardly towards the disc 1.

A pressure plate 19, extending diametrically across each side of the disc 1, is axially aligned with each channel member 3 and is axially slidable relative thereto towards or away from said disc. The pressure plates 19 are prevented from rotating by means of pins 19a each secured on the adjacent rectangular member 4 and passing through a hole 19b in its respective pressure plate, as shown more particularly in Fig. 4. The two opposite ends of each pressure plate 19 have secured thereto segmental pads 20 of friction material to frictionally engage the radially-extending sides of the disc. The screwed members 18 of the shafts 16 are adapted to contact the centre of each end of the pressure plates 19.

Each screwed member 18 may be provided with a torsion spring device for automatically taking-up wear, of the type described in my British patent specification No. 631,877. Preferably such a device is associated with a device of the type described in my British Patent 747,972 to retract the friction pads a predetermined distance after each brake application.

The disc 1 rotates freely with the shaft, the rollers 10 being located each at the bottom of the V of its associated cam-member 9 and in this relative position of the rollers 10 and cam-members 9 the brake lining 6 on the shoes 5 is spaced a short distance away from the outer periphery of the disc 1 and the segmental pads 20 of friction material are similarly spaced away from the radially-extending sides of the disc.

The operation of the brake is as follows.

On tensioning the brake cable 7 the brake shoes 5 are tightened about the outer periphery of the disc 1 and commence to rotate in the direction of rotation of the disc. On angular movement of this nature taking place the rollers 10 ride up one of the slopes of each of the cam-members 9, thereby moving the adjacent end of each arm 13 outwardly away from the disc. Angular movement of each arm 13 rotates the shaft 16 integral therewith in its bearings 17 in the channel member 3 and this in turn, acting through the eccentrically mounted screwed member 18, forces the pressure plates 19 towards the disc and the associated friction pads 20 into frictional engagement with the disc.

The main braking load is provided by the segmental friction pads 20 co-operating with the radially-extending sides of the disc, and this load increases substantially directly with the torque provided by the primary brake, i. e. the brake shoes 5. The braking load may be increased by further tensioning the brake cable 7 to increase the grip of the shoes 5 on the periphery of the disc 1. Further angular movement of the shoes follows, and the rollers 10 ride further up the slopes of the cam-member 9 to further operate the main brakes. Excessive angular movement of the shoes 5, such that the rollers 10 might ride off the slopes of the cam-members 9, is prevented by stops 21 on the shoes 5 adapted to contact the ends of the bridge-pieces 4.

To remove the braking load the tension in the brake cable 7 is removed. The spring 8 between the adjacent ends of the brake shoes 5 moves said shoes 5 out of contact with the periphery of the disc and the configuration of the rollers 10 and cam-members 9 assists this movement. The helical springs 14 at the ends of the roller spindles 12 likewise tend to move the ends of the arms 13 inwardly and thus, by centering the rollers 10 once more in the bottom of the V of the cam-members 9, move the brake shoes 5 angularly around the periphery of the disc and back to their original position. The rollers 10, in moving down the cam slopes to the bottom thereof, angularly move the arms 13 associated therewith to remove the main braking load.

In an alternative construction (not illustrated) the primary brake shoes 5, instead of frictionally engaging the outer periphery of a disc, may instead frictionally engage a drum extending axially from the periphery of a disc, the construction otherwise being similar to that herein described.

Having now described my invention—what I claim is:

1. A mechanical servo brake comprising a rotatable disc, a brake shoe comprising a pair of part-annular members pivotally connected at their adjacent ends and extending circumferentially around the outer periphery of said disc and operable frictionally to engage said outer periphery and angularly movable thereby, pads of friction material to engage the radially extending sides of said disc, and means actuated by the shoe for effecting frictional engagement between said brake pads and the radially-extending sides of the disc.

2. A mechanical servo brake according to claim 1 wherein the free ends of said part-annular members are adapted to be drawn together by means of an associated cable or lever mechanism.

3. A mechanical servo brake according to claim 2 wherein the part-annular members are slidably supported in guides which extend from a non-rotatable torque member.

4. A mechanical servo brake according to claim 1 wherein the means actuated by angular movement of the brake shoe comprise a cam-member and cam follower and are secured to one side of said brake shoe and a shaft supported in bearings secured to the said non-rotatable torque member is associated with said cam member by means of an arm having a cam follower at one end thereof whereby angular movement of the brake shoe moves the cam-member to rotate the shaft about its longitudinal axis.

5. A mechanical servo brake according to claim 4 wherein a member secured eccentrically to said shaft moves one of said pads of friction material toward the disc when said shaft is rotated.

6. A mechanical servo brake according to claim 5 wherein a pair of cam-members are secured to each side of said brake shoe, each pair being located at diametrically opposed locations.

7. A mechanical servo brake according to claim 6 wherein the complementary engaging surfaces of the cam-members and cam-followers are arranged to maintain the brake-shoes substantially concentric with the disc.

8. A mechanical servo brake according to claim 7 wherein said cam-members are axially slidable within limits, relative to said brake shoe.

9. A mechanical servo brake according to claim 8 wherein a pressure plate is located between said pads of friction material and said eccentrically secured member.

References Cited in the file of this patent

UNITED STATES PATENTS

| 2,057,422 | Dickson | Oct. 13, 1936 |
| 2,344,933 | Lambert | Mar. 21, 1944 |
| 2,359,805 | Tack | Oct. 10, 1944 |